US005262849A

United States Patent [19]
Mimura et al.

[11] Patent Number: 5,262,849
[45] Date of Patent: Nov. 16, 1993

[54] DIGITAL CAMERA PROCESSING DEVICE HAVING VARIABLY SETTABLE INTERPOLATION

[75] Inventors: Toshihiko Mimura; Eiji Ohara, both of Kanagawa, Japan

[73] Assignee: Canon Kabushiki Kaisha, Tokyo, Japan

[21] Appl. No.: 785,293

[22] Filed: Oct. 30, 1991

[30] Foreign Application Priority Data

Nov. 5, 1990 [JP] Japan .................................. 2-297078

[51] Int. Cl.⁵ .............................................. H04N 9/07
[52] U.S. Cl. ......................................... 358/43; 358/48
[58] Field of Search ...................... 358/213.17, 41, 44, 358/43, 48

[56] References Cited

U.S. PATENT DOCUMENTS

| 4,599,640 | 7/1986 | Dischert | 358/41 |
| 4,642,678 | 2/1987 | Cok | 358/43 |
| 4,734,759 | 3/1988 | Kobori et al. | 358/44 |
| 5,008,739 | 4/1991 | D'Luna et al. | 358/41 |
| 5,034,805 | 7/1991 | Ishizaka | 358/41 |
| 5,053,861 | 10/1991 | Tsai et al. | 358/41 |

Primary Examiner—Victor R. Kostak
Assistant Examiner—Jeffrey S. Murrell
Attorney, Agent, or Firm—Robin, Blecker, Daley & Driscoll

[57] ABSTRACT

A digital camera signal processing device includes an analog-to-digital converting circuit for performing analog-to-digital conversion of a signal supplied from an image sensor, a color-signal separating circuit for separating color signals corresponding to sampling points for respective colors from an output signal from the analog-to-digital converting circuit, and a color-signal interpolating circuit for interpolating color signals for sampling points where no color signals are present, on the basis of the color signals corresponding to the sampling points for the respective colors.

9 Claims, 16 Drawing Sheets

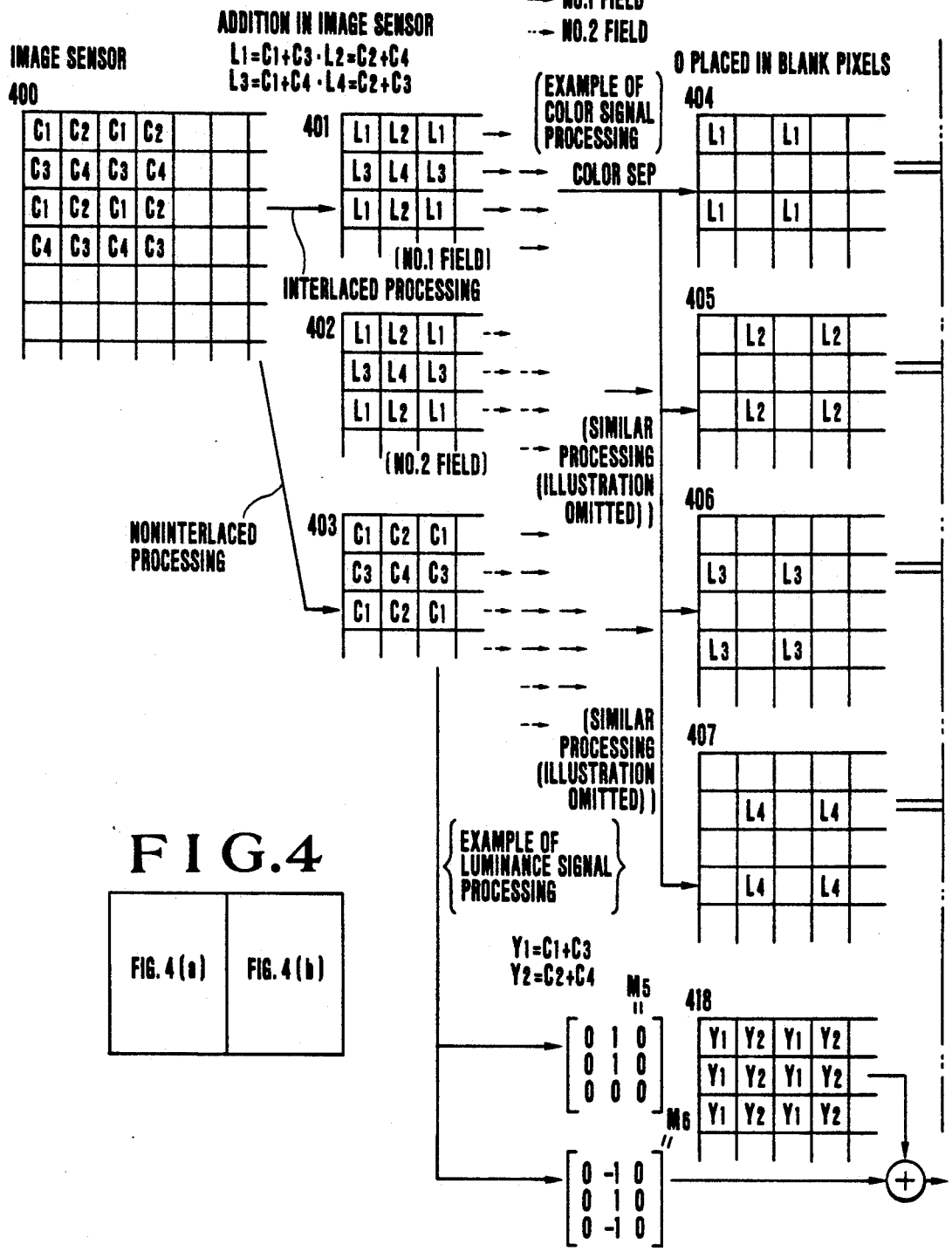

FIG.4(b)

ex.
2D FILTER
PROGRAMMABLE
MATRIX $$\begin{pmatrix} R \\ G \\ B \end{pmatrix} = \begin{pmatrix} a1 & a2 & a3 & a4 \\ a5 & a6 & a7 & a8 \\ a9 & a10 & a11 & a12 \end{pmatrix} \begin{pmatrix} L1 \\ L2 \\ L3 \\ L4 \end{pmatrix} \quad \begin{pmatrix} Y_L \\ R-Y \\ B-Y \end{pmatrix} = \begin{pmatrix} b1 & b2 & b3 \\ b4 & b5 & b6 \\ b7 & b8 & b9 \end{pmatrix} \begin{pmatrix} R \\ G \\ B \end{pmatrix}$$

$M_7$ \quad $M_8$

FIG.6(a)

| COLOR FILTER EXAMPLES | VLPF (RGB) MATRIX | VLPF OUT | HLPF MATRIX | HLPF OUT |
|---|---|---|---|---|
| C1 C2 C3 | $\frac{1}{1}\begin{pmatrix}0\\1\\0\end{pmatrix}$ | C1 0 0 C1 0 0 ---<br>0 C2 0 0 C2 0 ---<br>0 0 C3 0 0 C3 --- | $\frac{1}{3}(12321)$ | C1 C1 C1 C1 C1 ---<br>C2 C2 C2 C2 C2 ---<br>C3 C3 C3 C3 C3 --- |
| C1 C2<br>C1 C2<br>C1 C2<br>C1 C2<br>C1 C2<br>C1 C2<br>C1 C2 | $\frac{1}{2}\begin{pmatrix}1\\2\\1\end{pmatrix}$ | C1 0 C1 0 C1 0 ---<br>0 C2 0 C2 0 C2 ---<br>0 C3 0 C3 0 C3 --- | $\frac{1}{2}(1\;2\;1)$ | C1 C1 C1 C1 C1 ---<br>C2 C2 C2 C2 C2 ---<br>C3 C3 C3 C3 C3 --- |
| C1 C2<br>C1 C2<br>C3 C1<br>C3 C1<br>C1 C2<br>C1 C2<br>C3 C1<br>C3 C1 | $\frac{1}{2}\begin{pmatrix}1\\2\\1\end{pmatrix}$ | C1 C1 C1 C1 C1 ---<br>0 C2 0 C2 0 ---<br>C3 0 C3 0 C3 --- | $\frac{1}{2}(1\;2\;1)$ | C1 C1 C1 C1 C1 ---<br>C2 C2 C2 C2 C2 ---<br>C3 C3 C3 C3 C3 --- |
| C1 C2<br>C1 C3<br>C1 C2<br>C1 C3<br>C1 C2<br>C1 C3<br>C1 C2<br>C1 C3 | $\frac{1}{2}\begin{pmatrix}1\\2\\1\end{pmatrix}$ | C1 0 C1 0 C1 ---<br>0 C2 0 C2 0 ---<br>0 C3 0 C3 0 --- | $\frac{1}{2}(1\;2\;1)$ | C1 C1 C1 C1 ---<br>C2 C2 C2 C2 ---<br>C3 C3 C3 C3 --- |
| C1 C2<br>C3 C1<br>C1 C2<br>C3 C1<br>C1 C2<br>C3 C1 | $\frac{1}{2}\begin{pmatrix}1\\2\\1\end{pmatrix}$<br>COMMON TO RGB | C1 C1 C1 C1 C1 C1 ---<br>0 C2 0 C2 0 C2 ---<br>C3 0 C3 0 C3 0 --- | $\frac{1}{2}(1\;2\;1)$<br>COMMON TO RGB | C1 C1 C1 C1 ---<br>C2 C2 C2 C2 ---<br>C3 C3 C3 C3 --- |

FIG.6(b)

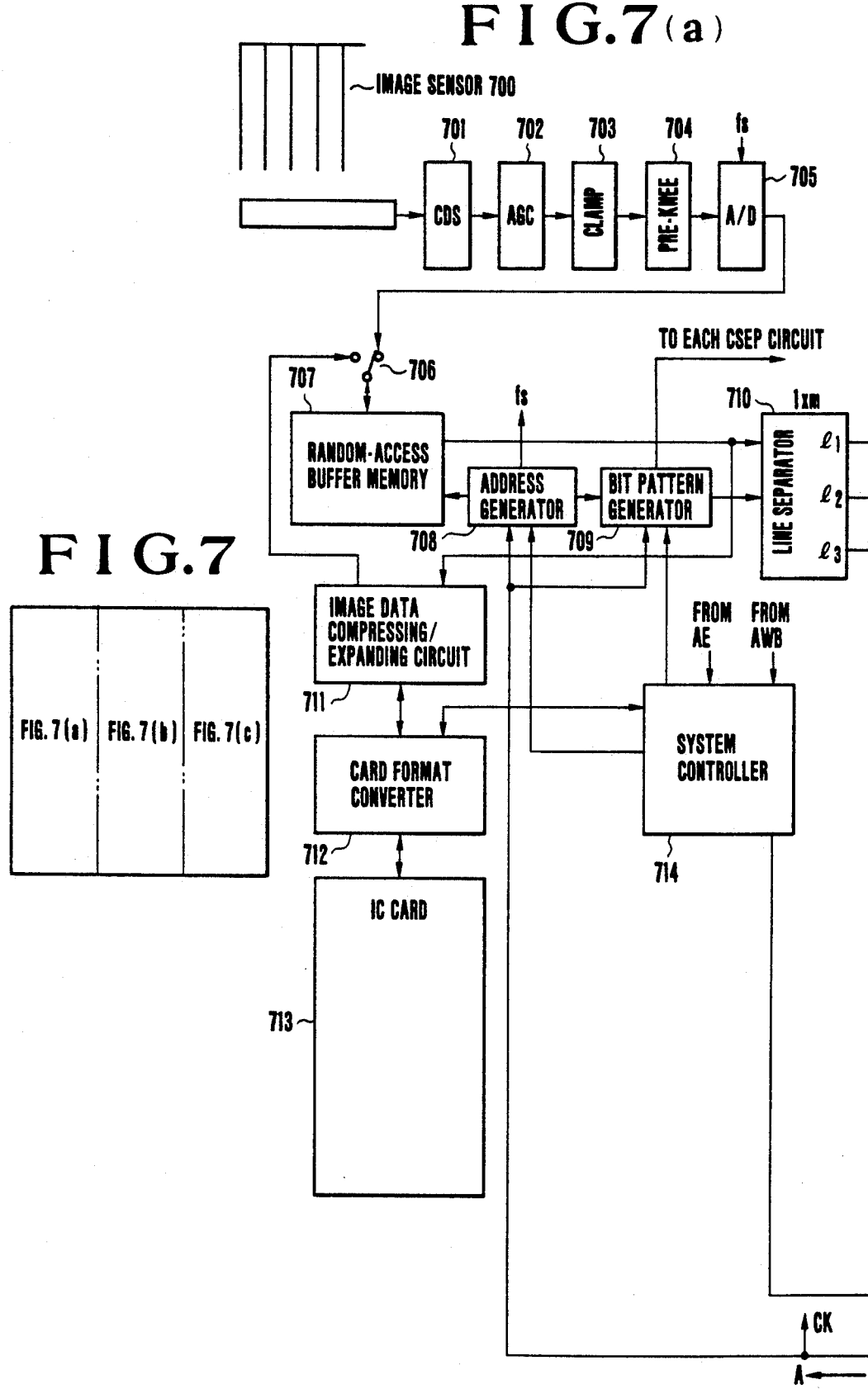

FIG.10

| NUMBER OF SAMPLINGS | CSEP Y1 | CSEP Y2 | CSEP Y3 | CSEP C1 | CSEP C2 | CSEP C3 | CSEP C4 |
|---|---|---|---|---|---|---|---|
| 1 | 111 | 111 | 000 | 111 | 000 | 000 | 000 |
| 2 | 111 | 000 | 000 | 000 | 101 | 010 | 000 |
| 3 | 111 | 111 | 000 | 111 | 000 | 000 | 000 |
| 4 | 111 | 000 | 000 | 000 | 000 | 000 | 000 |
| 5 | 111 | 111 | 000 | 111 | 000 | 000 | 000 |
| 6 | 111 | 000 | 000 | 000 | 101 | 010 | 000 |
| 7 | 111 | 111 | 000 | 111 | 000 | 000 | 000 |
| 8 | 111 | 000 | 000 | 000 | 000 | 000 | 000 |
| 9 | 111 | 111 | 000 | 111 | 000 | 000 | 000 |

NO.1 FIELD

EACH SET INCLUDING BIT PATTERNS $\ell_1$, $\ell_2$ AND $\ell_3$ FROM THE LEFT

DIGITAL CAMERA PROCESSING DEVICE HAVING VARIABLY SETTABLE INTERPOLATION

BACKGROUND OF THE INVENTION

1. Field of the Invention

The present invention relates to a digital camera signal processing device and, more particularly, to a device for directly digitizing a signal of an image sensor and performing signal processing on the digitized signal.

2. Description of the Related Art

In the field of analog signal processing, particularly so-called camera signal processing, different signal processing methods have conventionally bee utilized for different arrangements and structures of color filters for image sensors and different read-out methods therefor.

FIG. 1 shows an example of the arrangement of a vertical stripe system of Ye (yellow), G (green) and Cy (cyan). This system has a stripe structure in which each stripe consists of color filter elements of Ye, G and Cy which are respectively arrayed in three vertical columns. An image sensor (CCD) 200 transfers the signals of the respective color filter elements on a line-by-line basis in an interlaced manner to a CDS circuit 201. The CDS (Correction Double Sampling) circuit 201 extracts a difference signal from the input signal by effecting double-clamping, thereby eliminating noise which is called 1/f noise. An AGC (automatic gain control) amplifier 202 for sensitivity compensation raises its gain when the level of the signal from the image sensor 200 is low. Thus the AGC amplifier 202 outputs a sequential signal of Ye, G and Cy. A sample-and-hold circuit 203 separates the sequential signal of Ye, G and Cy into individual Ye, G and Cy signals. The signals sampled and held in the sample-and-hold circuit 203 form a three-phase signal in which the Ye, G and Cy signals differ in phase by 120°. The Ye, G and Cy signals thus separated are subjected to the following processing as color signals. Since Ye=R+G and Cy=B+G, R and G are calculated from R=Ye−G and B=Cy−G. A matrix circuit 206 performs processing for R=Ye−G and B=Cy−G and produces a three-phase signal of R, G and B. The RGB signals are subjected to white balance adjustment in corresponding white balance circuits (WB) 207 on the basis of a signal which is obtained from an external-light measuring sensor 215 and associated circuit elements. The outputs of the white balance circuits 207 are subjected to gamma correction in the respective gamma correction circuits 209 and are then converted into color-difference signals B-Y and R-Y in a chroma matrix circuit 210. The color-difference signals B-Y and R-Y are respectively passed through low-pass filters 212 and 213 into an encoder.

In the meantime, processing of luminance signals is performed in the following manner. The separated Ye, G and Cy signals are applied to a level balance circuit 204, which in turn corrects the level variations or the like of the Ye, G and Cy signals which may result from variations in the characteristics of the color filter elements of Ye, G and Cy. Then, the thus-corrected signals are again converted into a sequential signal of Ye, G and Cy by a switch 205. The sequential signal outputted from the switch 205 is band-limited by a low-pass filter 211 and inputted into the aforesaid encoder. A low-pass filter 214 is provided for taking out a suppress signal used to compress a false color which often occurs in a high-luminance portion when a complementary-color filter is used. The suppress signal obtained by the low-pass filter 214 is supplied to a suppress circuit in the encoder and the suppress circuit performs a color-removing operation.

FIGS. 2(a) and 2(b) show a representative example of a complementary-color mosaic system. In FIGS. 2(a) and 2(b), a depiction of the entire system as in FIG. 1 is omitted. The shown system is intended for a color filter arrangement which assumes the structure $$\begin{matrix} Mg & G & Mg & G \\ Cy & Ye & Cy & Ye \end{matrix} \ldots$$

along an n-th line and the structure $$\begin{matrix} Mg & G & Mg & G \\ Ye & Cy & Ye & Cy \end{matrix} \ldots$$

along an (n+1)-th line, as shown in FIG. 2(b). The signal from the image sensor of the system is a sequential signal which is read out in an interlaced manner, as in FIG. 1. First, this image sensor outputs a color signal from the n-th line, as in the form Mg+Cy, G+Ye, Mg+Cy and G+Ye, and then from the (n+1)-th line in a mixed form different from that of the n-th line, such as Mg+Ye, G+Cy, Mg+Ye and G+Cy. The RGB components of each of these signals are arranged as shown in FIG. 2(b), that is to say, a BGBG component is obtained by passing the signal of the n-th line through a band-pass filter 301 and an RGRG component is obtained by passing the signal of the (n+1)-th line through the band-pass filter 301. The BGBG component and the RGRG component are subjected to detection, whereby color-difference signals of Cn=2B−G and Cn+1=2R−G are obtained.

In the meantime, processing of the luminance signals is performed in the following manner. The signals from the n-th line and the (n+1)-th line are passed through a low-pass filter 300, in which the signal from the n-th line is subjected to processing of Yn=(Ye+G)+(Cy+Mg)=2R+3G+2B, while the signal from the (n+1)-th line is subjected to processing of Yn+1=(Ye+Mg)+(Cy+G)=2R+3G+2B. The resultant signal is inputted into a process circuit 303. White balance adjustment is performed on the basis of the state of the color-difference signals. A low-pass filter 302 is provided for forming a signal for white balance adjustment, and the white balance adjustment is performed on the basis of this signal. As a matter of course, the low-pass filter 302 outputs different signals according to whether the input signal has been obtained from the n-th line or the (n+1)-th line. To cope with such different signal outputs, a 1H delay line 304 is provided and the two color-difference signals are converted into simultaneous signals by a switching circuit 305. The thus-obtained Y=2R+3G+2B and 2R-G, 2B-G are handled as a luminance signal and color-difference signals, respectively, and inputted into the encoder. Many other color filter arrangements are proposed, and the number of outputs from the image sensor is not necessarily limited to one. Some image sensors would provide interlaced outputs and others, noninterlaced outputs.

As is apparent from the foregoing description, the construction of a certain camera signal processing circuit is unique to a specific color filter arrangement which is prepared for a certain type of image sensor, and if a color filter of different arrangement is adopted for image sensors, it is necessary to change signal-processing ICs. As a result, the freedom of selection from image sensors is restricted when various products are to be developed and produced. In addition, in the case of a completely solid-state camera or the like in which digital data is recorded in a semiconductor memory, different makers adopt different color filter arrangements. Therefore, if compatibility with various image sensors is to be assured, it is inconveniently necessary to record a sensor output temporarily as separate signals, a luminance signal and color-difference signals.

To cope with the above-described problems, a method for realizing general-purpose camera signal processing has been proposed. In this method, image data formed on an image sensor is temporarily stored in a memory and is subsequently converted into pixel data in an n×m window. Then, conversion from the n×m pixels into Y (luminance) data, R (red) data, G (green) data and B (blue) data is performed through matrix computations, and identical processing is subsequently performed on the respective data. However, in such an example, for the matrix computations, it is necessary to program information indicative of what color is present in what position of the window, and it is also necessary to use means for scanning the window on the memory. This leads to the problem that a large circuit scale is needed. If there is no memory, a system utilizing the aforesaid method is unable to operate.

SUMMARY OF THE INVENTION

An object of the present invention which has been made to solve the above-described problems is to provide a general-purpose digital camera signal processing device capable of effecting camera signal processing irrespective of the arrangement of a color filter for an image sensor.

To achieve the above object, in accordance with the present invention, there is provided a digital camera signal processing device which is arranged in the manner described in each of the following paragraphs (1), (2), (3) and (4).

(1) The digital camera signal processing device comprises analog-to-digital converting means for performing analog-to-digital conversion of a signal supplied from an image sensor, color-signal separating means for separating color signals corresponding to sampling points for respective colors from an output signal from the analog-to-digital converting means, and color-signal interpolating means for interpolating color signals for sampling points where no color signals are present, on the basis of the color signals corresponding to the sampling points for the respective colors.

(2) In the digital camera signal processing device set forth in paragraph (1), the color-signal interpolating means is a programmable two-dimensional filter.

(3) In the digital camera signal processing device set forth in paragraph (1), the color-signal interpolating means is a combination of programmable one-dimensional filters.

(4) The digital camera signal processing device set forth in paragraph (1), (2) or (3) further comprises a memory into which the output signal from the analog-to-digital converting means is written and from which a signal is read and supplied to the color-signal separating means.

According to any of the arrangements described in paragraphs (1), (2), (3) and (4), it is possible to obtain color signals corresponding to all sampling points irrespective of the arrangement of a color filter for an image sensor, a read-out method for the image sensor or the like.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a unitary diagram illustrating orientation of the sheets containing FIGS. 4(a) and 4(b); FIGS. 4(a) and 4(b) constituting an explanatory view of the first embodiment of the present invention;

FIGS. 6(a) and 6(b) are explanatory views of a second embodiment;

FIG. 7 is a unitary diagram illustrating orientation of the sheets containing FIGS. 7(a), 7(b) and 7(c); FIGS. 7(a), 7(b) and 7(c) constituting a schematic block diagram of a third embodiment of the present invention; and FIGS. 8, 9 and 10 are explanatory views of the third embodiment.

DETAILED DESCRIPTION OF THE PREFERRED EMBODIMENTS

Figure 1:
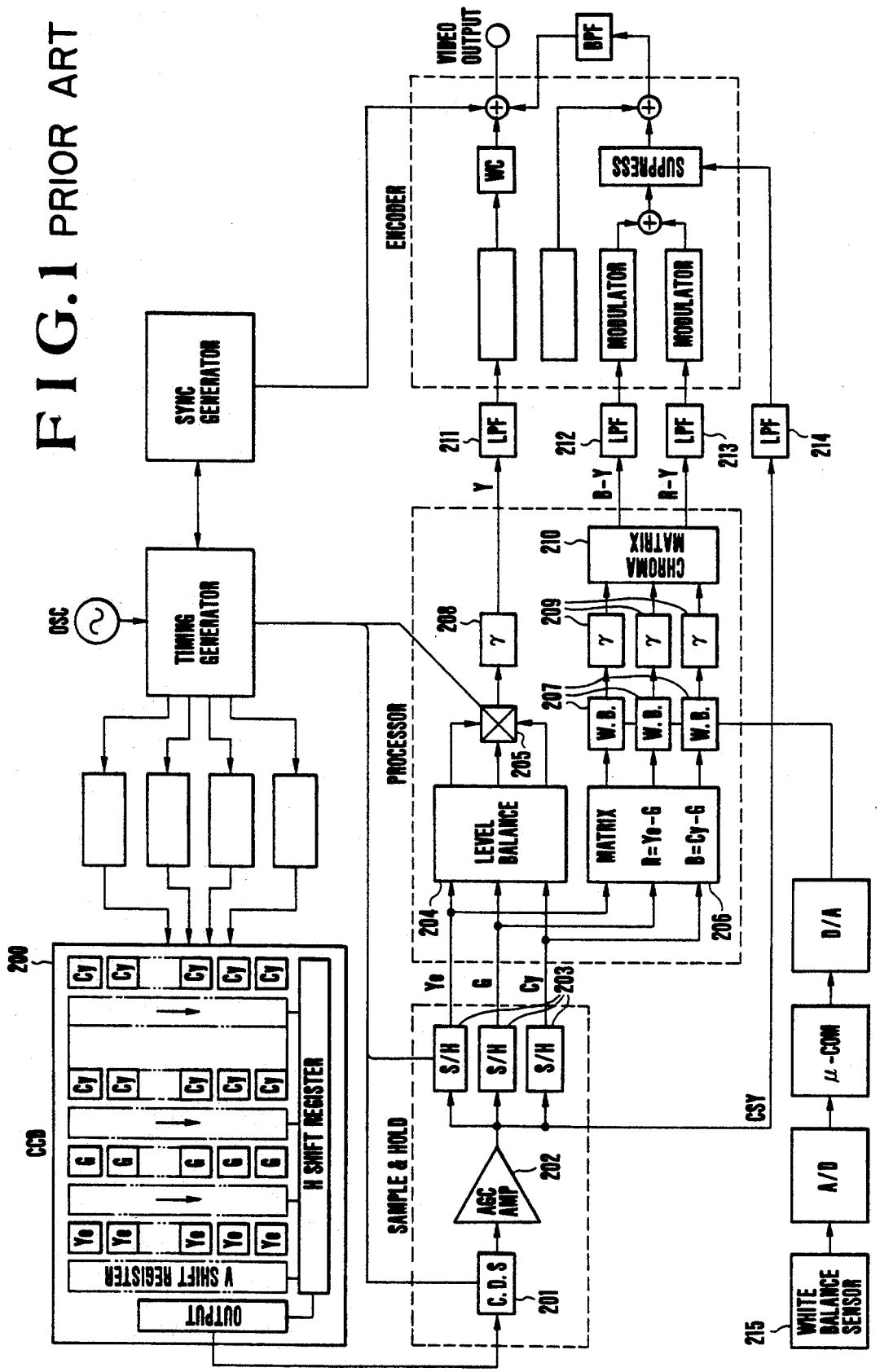
FIG. 1 is a schematic block diagram showing a conventional example.
Figure 2A:
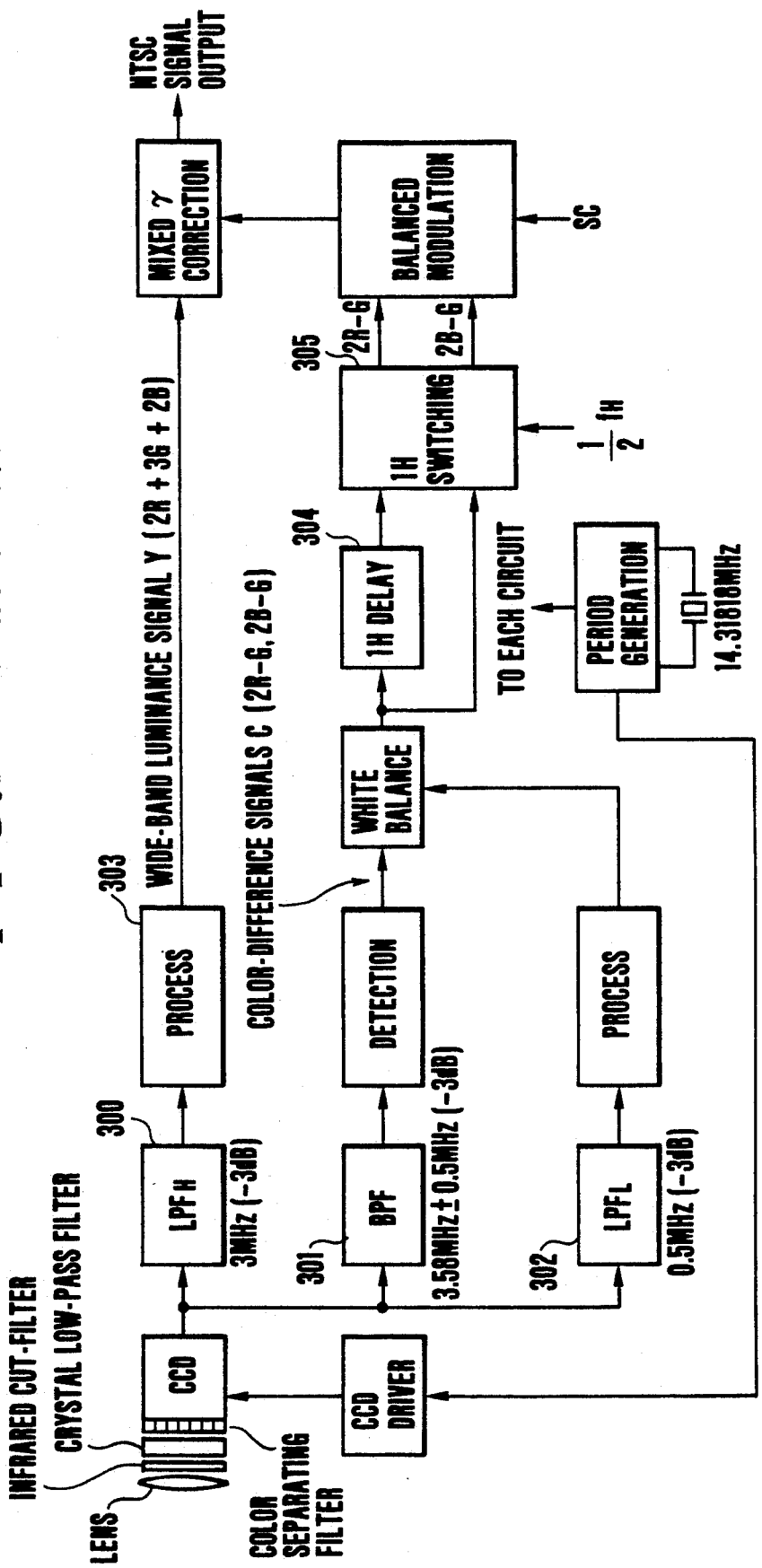
FIG. 2(a) is an explanatory block diagram schematically showing another conventional example.
Figure 2B:
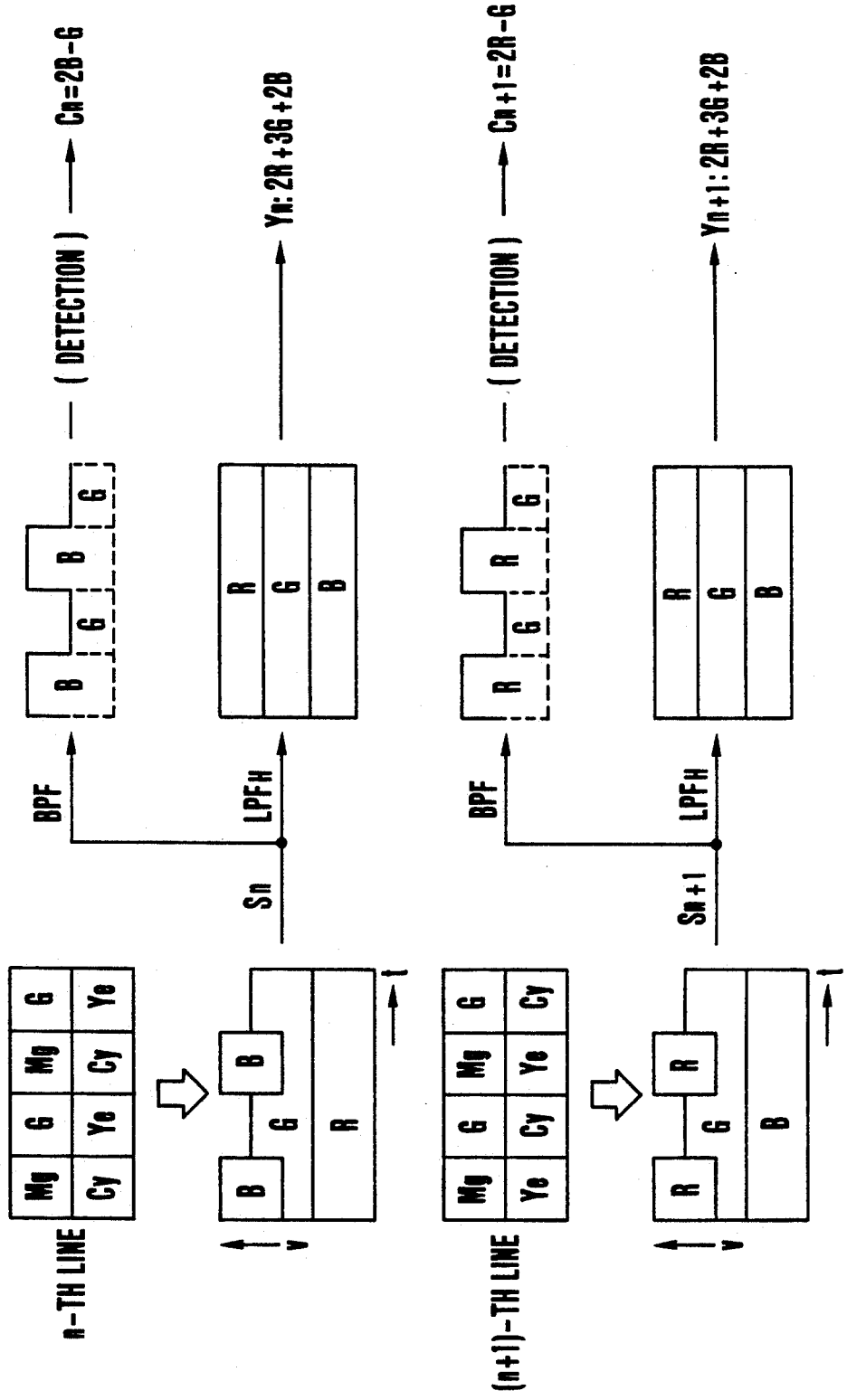
FIG. 2(b) is an explanatory view showing the conventional example.
Figure 3A:
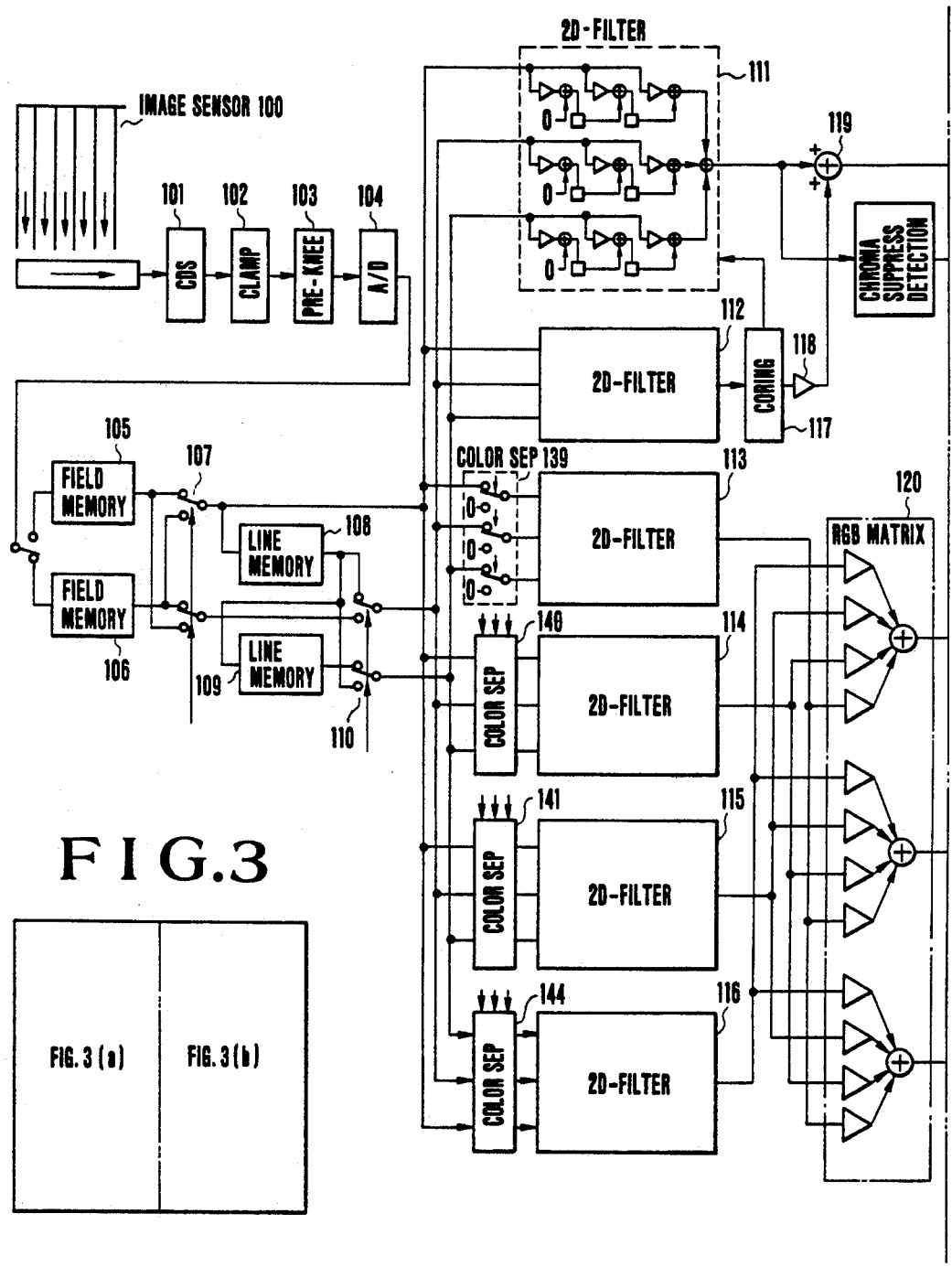
FIGS. 3(a) and 3(b) constituting a schematic block diagram of a first embodiment of the present invention.
Figure 3:
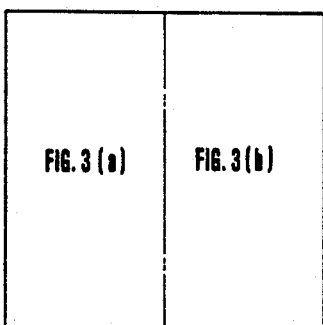
FIG. 3 is a unitary diagram illustrating orientation of the sheets containing FIGS. 3(a) and 3(b)
Figure 3B:
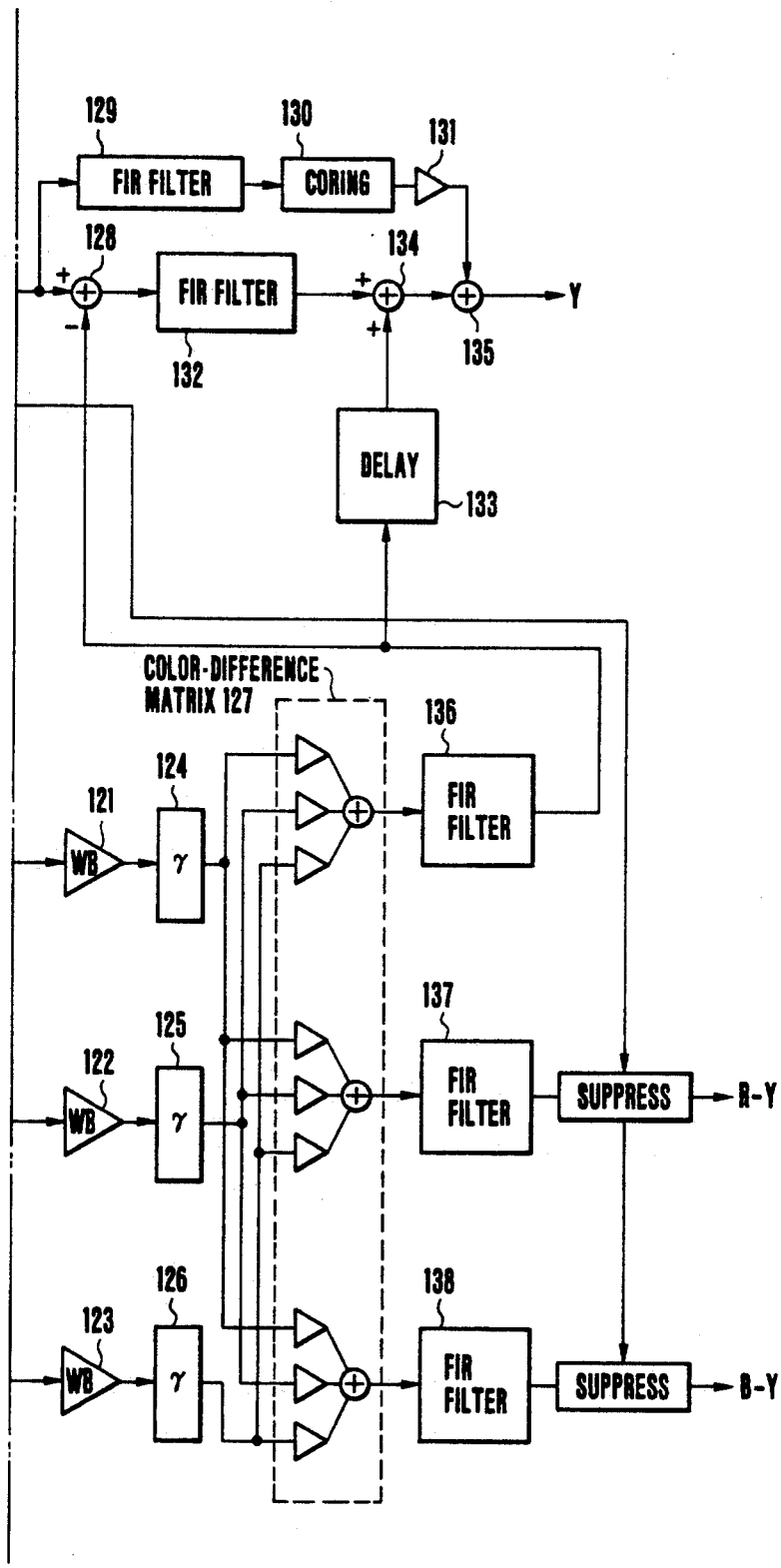

Preferred embodiments of the present invention will be described below in detail with reference to the accompanying drawings. FIGS. 3(a) and 3(b) constitute a schematic block diagram of an image sensing apparatus according to a first embodiment of the present invention. Referring to these figures, pixel signals photoelectrically converted in an image sensor 100 are sequentially read out and are then subjected to noise cancelling in a CDS circuit 101. The output from the CDS circuit 101 is clamped at a predetermined level in a clamp circuit 102 and the high-luminance band of the output from the clamp circuit 102 is compressed in a pre-knee circuit 103. Thus a sequential digital signal is outputted from an A/D (analog-to-digital) converter 104. Field memories 105, 106, switches 107, line memories 108, 109 and switches 110 serve as a converter for providing an output in a noninterlaced manner when the arrangement of a color filter for the image sensor 100 is line-sequential on a line-by-line basis.

The operation of each constituent element of the device will be described below with reference to FIGS. 4(a) and 4(b) which show the form of concrete signals. If signals from the image sensor 100 are spatially arranged as shown in part 400, during an interlaced operation, a first field (No. 1 field) is outputted in the form C1, C2, ..., C1, C2, ..., and a second field (No. 2 field) is outputted in the form C3, C4, ..., C4, C3, .... As a result, a color component for each field runs short. For this reason, in general, adjacent vertical pixels in the image sensor 100 are added together and outputted, as shown in parts 401 and 402. In the first embodiment, in addition, a method in which after the signals from the image sensor 100 have been temporarily recorded in memory, l lines are outputted vertically as shown in part 403 and every second line is scanned is implemented by a leading-stage circuit, thereby enabling flexible signal processing.

Each color separation circuit 139, 140, 141 and 144 of FIG. 3(a) separates a signal of a particular color from the color signals flowing in each line, and if there is a place in which no signal is selected, "0" is inserted in that place. Parts 404 to 407 of FIG. 4(a) spatially represent the color signals separated by the color separation circuits 139, 140, 141 and 144. The places in each of which "0" has been inserted by the color separation circuits 139, 140, 141 and 144 are interpolated by corresponding two-dimensional (spatial) filters 113 to 116, so that the separated color signals assume the forms shown in parts 408 to 411 of FIG. 4(b), respectively. The signals thus obtained can be converted into RGB signals according to a decoding matrix expression M7 of FIG. 4(b). Subsequently, the RGB signals are subjected to white balance adjustment by white balance circuits 121, 122 and 123 and then to gamma conversion by gamma conversion circuits 124, 125 and 126, and are subsequently inputted to a color-difference matrix conversion circuit 127. The color-difference matrix conversion circuit 127 converts the input signals into a luminance signal Y and color-difference signals R-Y, B-Y, and outputs these signals.

The luminance signal Y is not subjected to a separation process such as that performed on the color signals, and is subjected to two-dimensional filtering similar to color digital filtering without modification. A luminance-signal low-pass filter 111 compensates for a difference in luminance level or the like due to, for example, the difference between the spectral characteristics of each color filter element. The output of a luminance-signal high-pass filter 112 is supplied to a coring circuit 117, in which its noise component is cut. The output of the coring circuit 117 is passed through a coefficient unit 118 and added to the output of the low-pass filter 111 in an adder 119, thereby correcting a vertical aperture response lowered by the luminance-signal low-pass filter 111. In the first embodiment, such addition is performed by the two two-dimensional filters 111 and 112 in the above-described luminance signal processing circuit, but this arrangement is not a limiting example. For example, as interpolation signal processing, there is the processing of forming an ideal luminance signal at a certain color temperature. If such processing is to be supported, it is necessary to prepare three two-dimensional filters for parallel processing.

The thus-converted luminance signals YH, YL and color-difference signals R-Y, B-Y are handled in completely integrated signal processing. The luminance signals YH and YL are subjected to vertical processing by the elements 111, 112, 117, 118 and 119, and then a low-frequency component is subtracted from the output of the adder 119 by a subtracter 128 and its high-frequency component is limited by an FIR filter 132. Then, a low-frequency component is added to the output of the FIR filter 132 in an adder 134. Incidentally, a latch group 133 produces a delay equivalent to a group delay provided by the digital filter 132, a digital high-pass filter 129 corrects the frequency characteristics lowered by the filter 132, a coring circuit 130 suppresses noise, and a coefficient unit 131 determines the amount of aperture correction.

It is to be noted that the field memories used in the first embodiment are not needed in the case of an image sensor in which color signals from the array of color filter elements can be restored to RGB signals on the basis of only intrafield correlation.

In the above-described manner, it is possible to obtain signals corresponding to all sampling points for each color by color-signal separating means and signal interpolating means irrespective of the arrangement of a color filter provided on an image sensor. Accordingly, since there is no need to change the arrangement of the device for each color filter arrangement, it is possible to realize camera signal processing without the need for a specially large circuit scale.

If the range of use may be limited, it is generally considered that eight kinds of filter elements, W (white), Ye (yellow), Cy (cyan), Mg (magenta), Y (luminance), R (red), G (green) and B (blue), are needed. Accordingly, in the construction of the first embodiment, a maximum of eight color separating means and a maximum of eight two-dimensional filters are needed for color signal processing (the color separating means and the two-dimensional filters are each needed by a number corresponding to the number of kinds of color filter elements which are simultaneously used). In addition, a maximum of three two-dimensional filters are needed for luminance processing as described previously. Thus the circuit scale increases to a considerable extent.

In the field of video movie cameras, it is generally considered that luminance signals are important, and sensitivity is also regarded as important because no flash can be used. For these reasons, it is customary that nearly all video movie cameras are provided with complementary-color filter elements of W, Ye, Cy, Mg and the like as color filter elements.

On the other hand, a still image input apparatus or broadcasting video equipment mainly uses a pure-color filter from the viewpoint of color reproducibility. Since the present invention is essentially based on RGB processing, it is possible to realize an extremely simplified signal processing system for an image sensor using a pure-color filter. The reasons are as follows: (a) white balance adjustment can be performed on an input front stage; (b) since gamma correction can be performed on the input front stage, signal processing can be performed within a compressed dynamic range; (c) since the number of kinds of color filter elements can be limited, the number of digital filters can be reduced; and (d) a matrix for conversion to RGB is not needed.

The two-dimensional filters will also be considered. In general, interpolation after color separation can be implemented with a matrix of m×n. In practice, however, m×n is often expressed as (1×m) (1×n) ( represents convolution). In other words, by processing such interpolation separately as vertical processing and horizontal processing, it is possible to reduce greatly the circuit scale.

Figure 5:
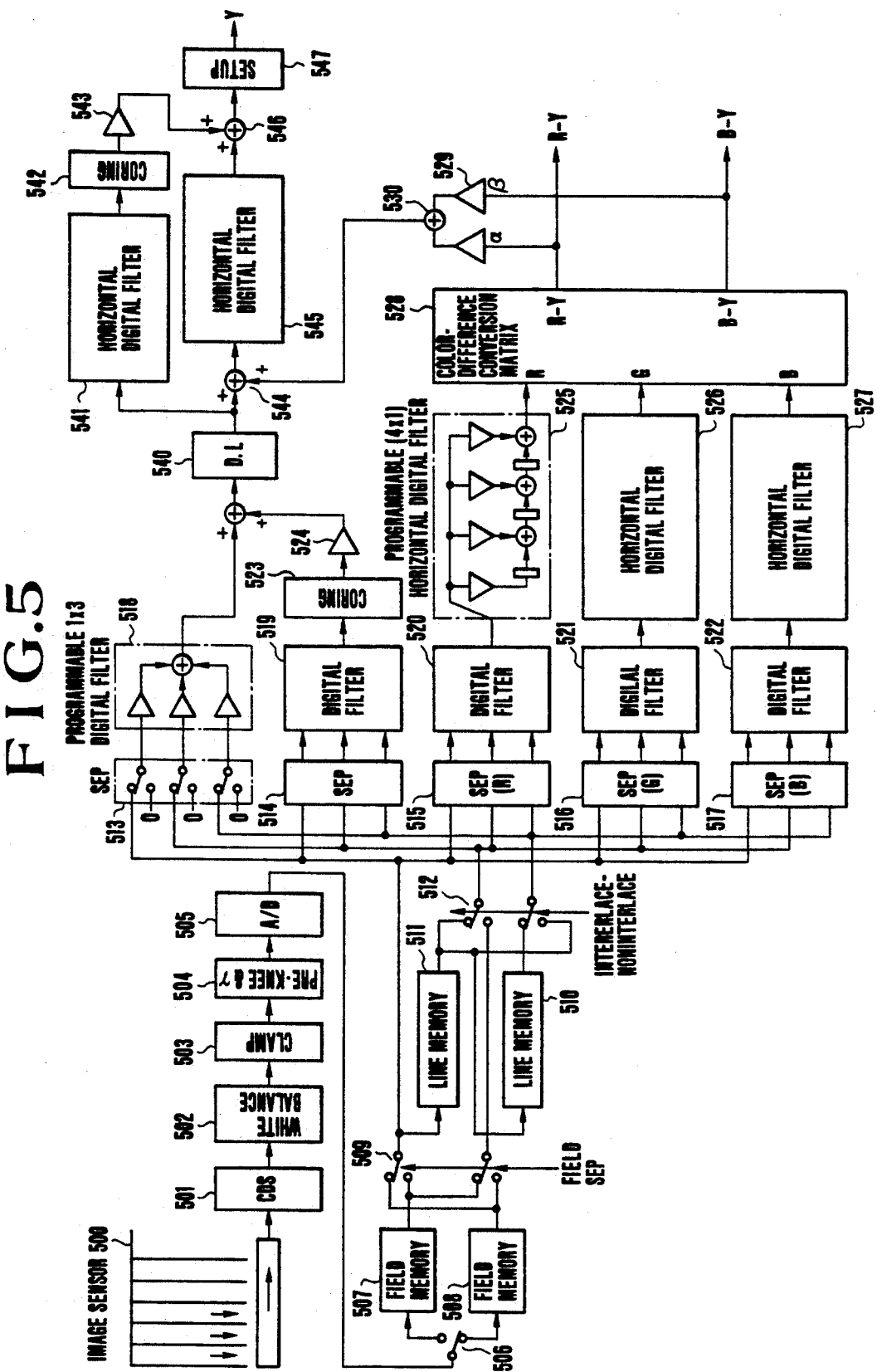
FIG. 5 is a schematic block diagram of a second embodiment of the present invention.
Figure 6B:
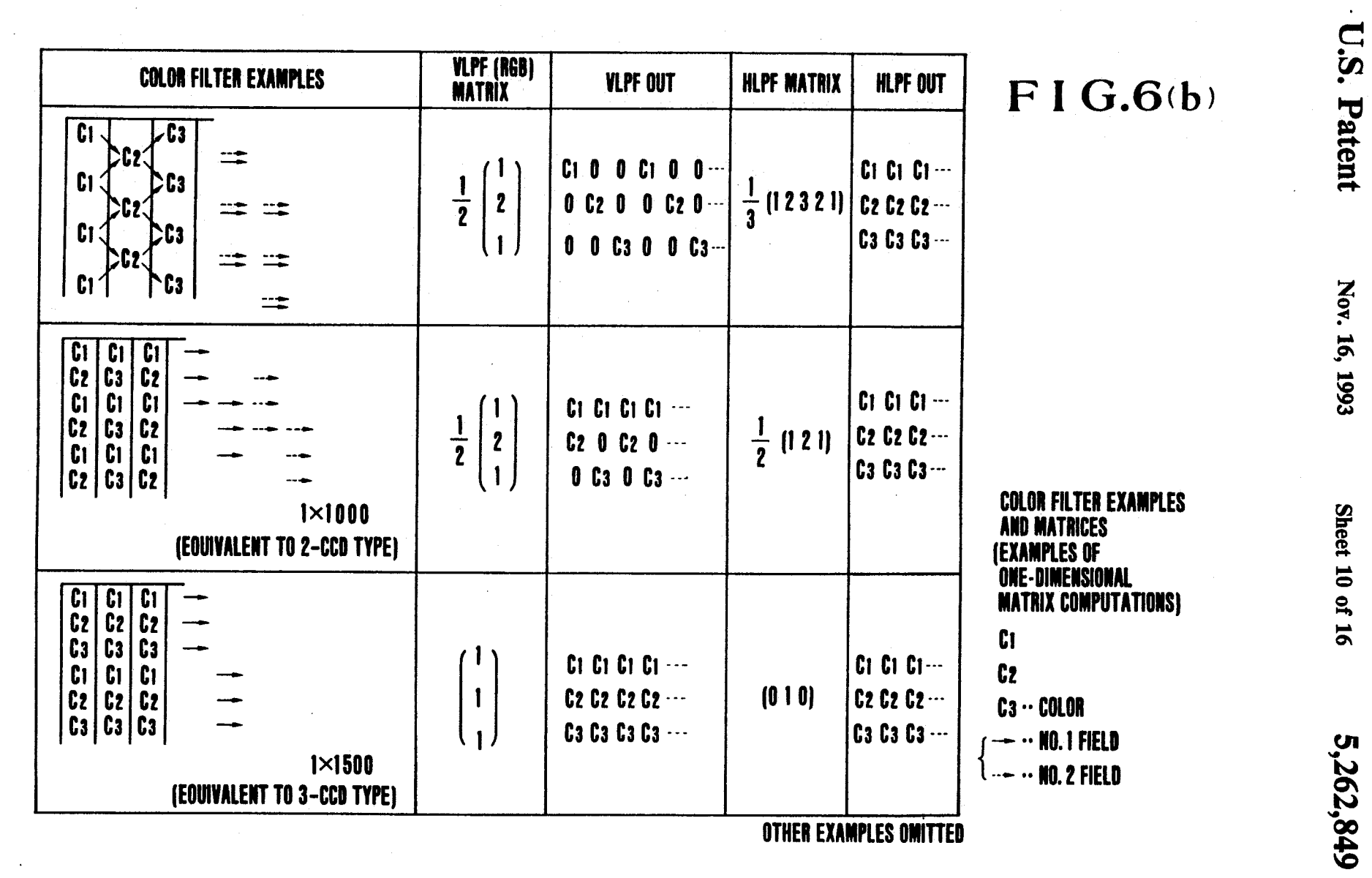

FIG. 5 is a schematic block diagram of a general-purpose digital camera signal processing device for a pure-color filter according to a second embodiment of the present invention based on the above-described concept. FIGS. 6(a) and 6(b) show representative color filter arrangements and corresponding digital filter coefficients in the signal processing of FIG. 5.

As shows in FIGS. 6(a) and 6(b), it is possible to obtain signals corresponding to all sampling points for each color irrespective of the arrangement of a color filter and a read-out method for an image sensor.

Figure 7B:
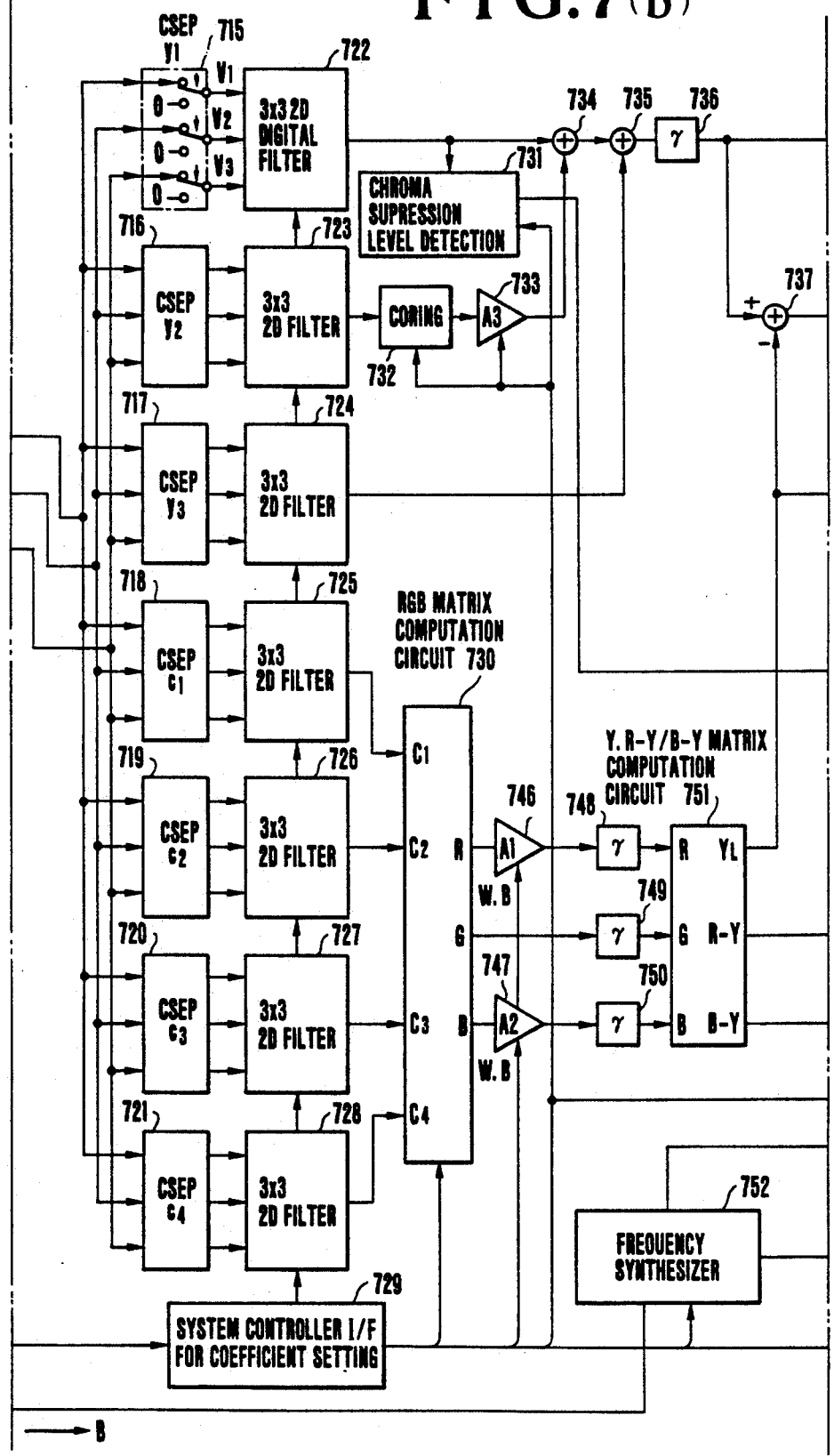
Figure 7C:
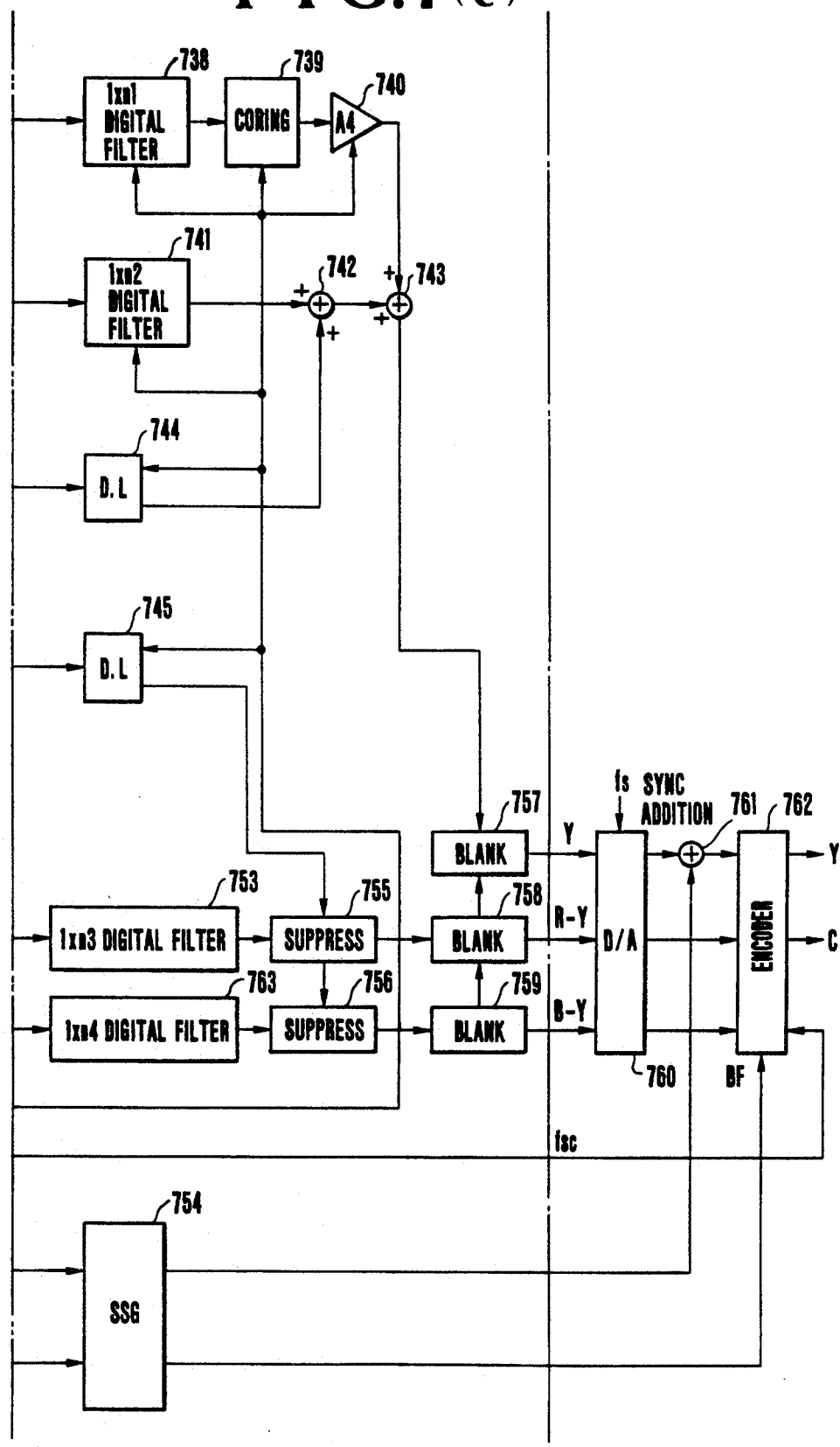
Figure 8:
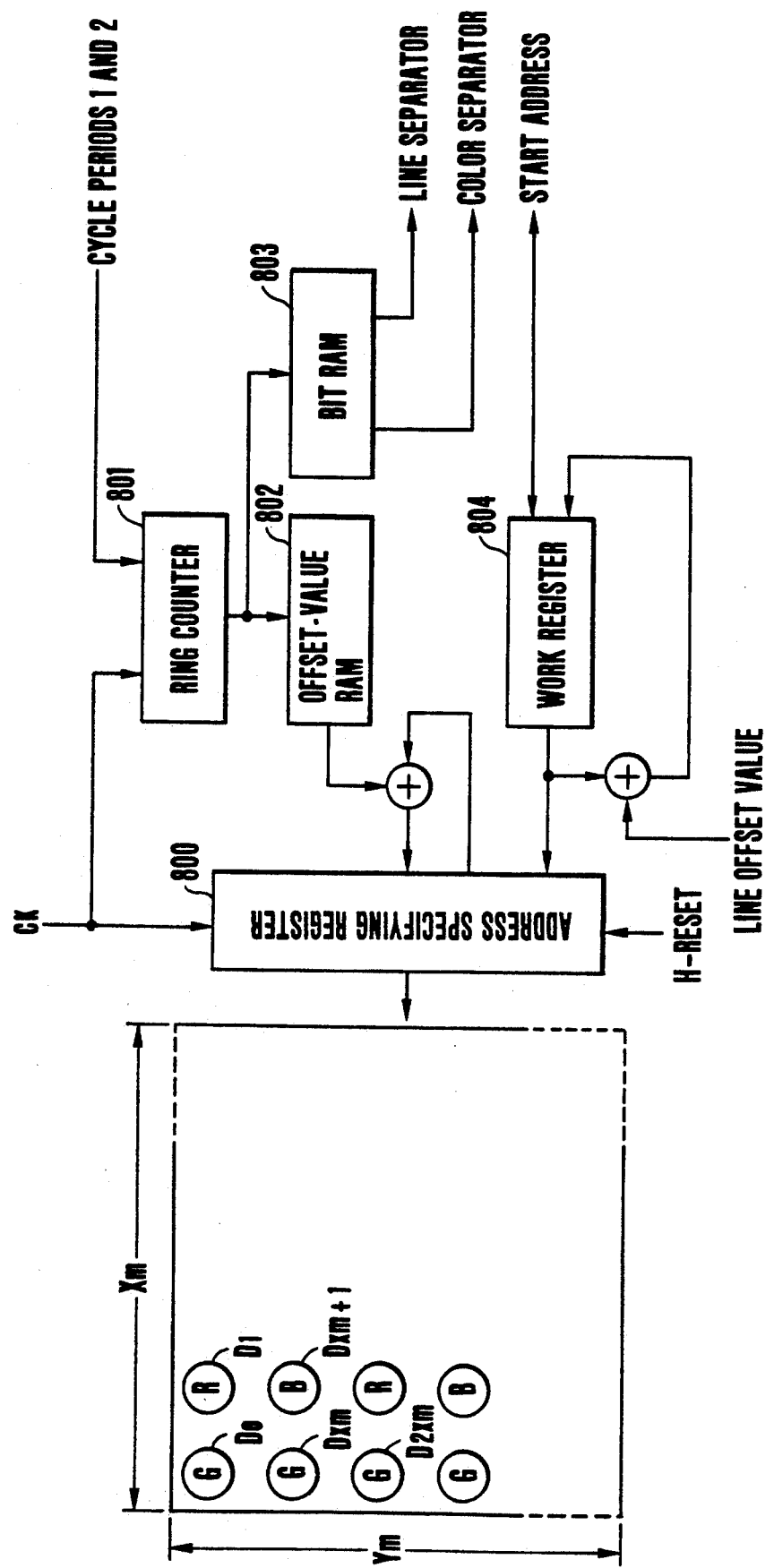

FIGS. 7(a), 7(b) and 7(c) constitute a schematic block diagram showing a third embodiment in which the present invention is applied to a card camera using a semiconductor memory as a recording medium. Image data formed on and photoelectrically converted by an image sensor 700 is passed through a path consisting of elements 701 to 705 and stored in a random access memory 707. The random-access memory 707 is capable of operating at a speed j times the sampling speed of the A/D (analog-to-digital) converter 705. Data on each pixel in the image sensor 700 is stored, as in the form shown in FIG. 8. In FIG. 8, D0 represents address 0 and there is shown a combination of G stripes and R/B line-sequential arrays. The element 800 shown in FIG. 8 is a register for specifying an address for the random-access memory 707, and data specified by the register 800 is outputted from the memory 707. A memory 802 stores an offset value, and a memory 803 stores a control signal pattern for controlling a line separator 710 and color separators 715 to 721. The line separator 710 serves to hold a selected signal, and each of the separators 715 and 721 selects each line in response to "1" which is externally supplied, and when "0" is inputted, the line goes to "0" and is outputted.

Figure 9:
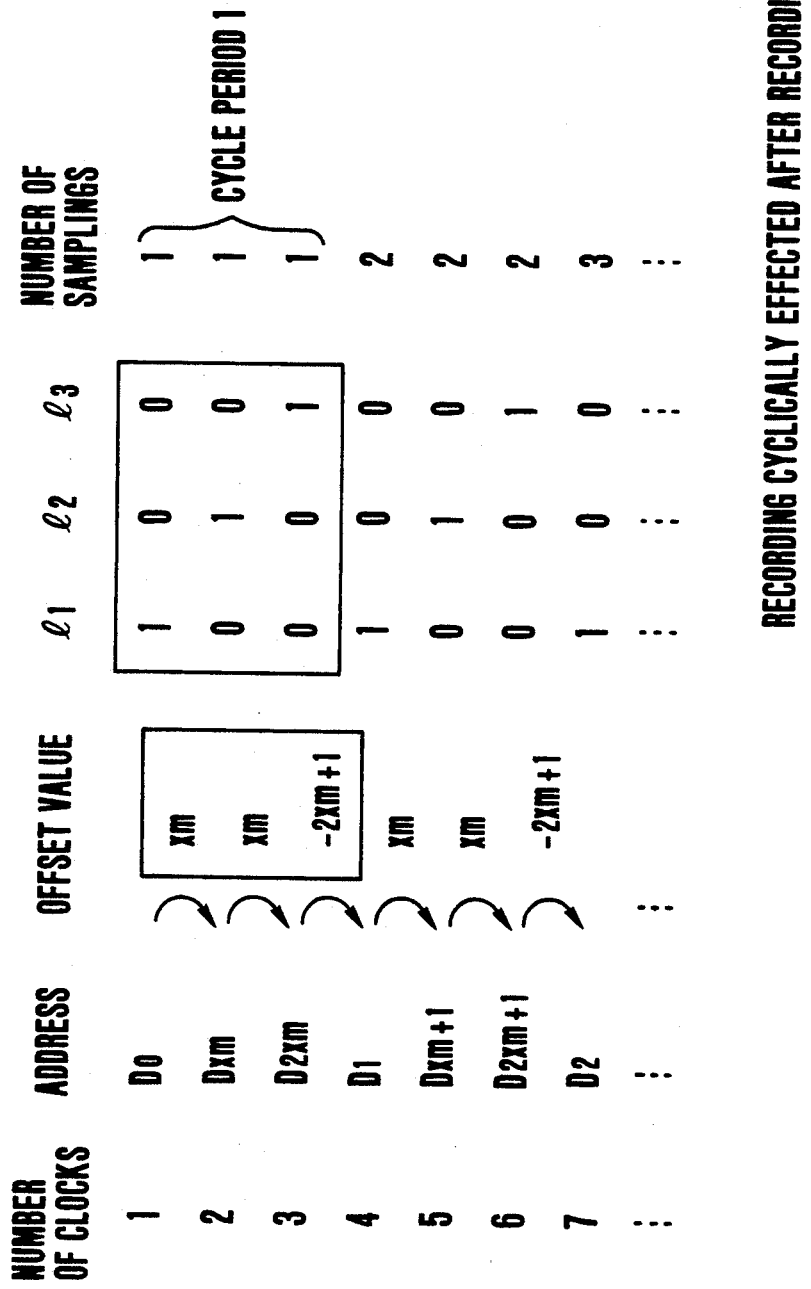

In the case of a combination of G stripes and R/B line sequential arrays such as that shown in FIG. 8, each constituent element operates as shown in FIG. 9. As illustrated, start address D0 corresponding to the leading part of each field is written into a work register 804. Then, H-RESET (a reset signal for each line) is inputted to the address specifying register 800, and the value of the address specifying register 800 goes to D0. The value of the address specifying register 800 is added to the value of the offset value RAM 802 and returned to its initial value at the cycle of the next clock CK. In this case, if an offset value Xm is stored in the offset value RAM 802, a new address value is D (0+Xm), which indicates Dxm. Subsequently, D2xm, D1, Dxm+1, ... are arranged in that order in accordance with the clock CK. Terminals 11 to 13 of the line separator 710 serve to separate these signals into three lines. The selected signals are outputted from the terminals 11 to 13 of the line separator 710 in response to "1" and also the selected signals are held in the line separator 710 until the next "1" appears. FIG. 10 shows the operations of color separators for individual sampling periods. Bit patterns associated with the terminals 11 to 13 are outputted to each color separator 715 to 721 in accordance with a sampling clock, and the color separators 715 and 721 generate signals to be inputted to corresponding two-dimensional filters 722 to 728. By setting the digital filter 722 of FIG. 7(b) to $$\frac{1}{4}\begin{pmatrix}010\\020\\010\end{pmatrix},$$

a signal corrected for spectral sensitivity for field is outputted. By setting the digital filter 723 to $$\begin{pmatrix}-1\\2\\-1\end{pmatrix},$$

the vertical component lowered by the digital filter 722 is extracted. Then, the extracted vertical component is subjected to coring for removing noise in a coring circuit 732 and is then subjected to adjustment of correction amount in a coefficient unit 733. In an adder 734, the output of the coefficient unit 733 is added to the output of the two-dimensional filter 722 to form a wide-band pseudoluminance signal YH. A circuit 731 is a circuit for generating a detection signal for compressing a false color which is observed in a high-luminance portion when a complementary-color filter is use, and a decision level is set in advance by a system controller 714.

The color signals are, in the case, assigned as follows: C1 (filter 725)=green; C2 (filter 726)=red; and C3 (filter 727)=blue. The input of C1 is vertical three columns of G0G0 signals and is interpolated with $$\begin{pmatrix}010\\121\\010\end{pmatrix},$$

the input of C2 is interpolated with $$\begin{pmatrix}121\\242\\121\end{pmatrix},$$

and the input of C3 is interpolated with $$\begin{pmatrix}000\\121\\000\end{pmatrix}.$$

Thus, the respective outputs of C1, C2 and C3 become interpolated signals of RGB.

To divide these signals, an RGB matrix computation circuit 730 performs computations on $$\begin{bmatrix}R\\G\\B\end{bmatrix}=\begin{bmatrix}010\\100\\001\end{bmatrix}\begin{bmatrix}C_1\\C_2\\C_3\end{bmatrix}.$$

Outputs R and B of the circuit 730 are subjected to white balance adjustment in coefficient units 746 and 747, respectively, and the outputs of the coefficient units 746 and 747 and an output G of the circuit 730 are subjected to gamma correction in gamma correction circuits 748 and 750. A Y, R-Y, B-Y matrix computation circuit 751 forms color-difference signals R-Y and B-Y from the outputs from the gamma correction circuits 748 to 750, and the color-difference signals R-Y and B-Y are inputted into band-limiting filters 753 and 763, respectively. The band-limiting filters 753 and 763 are horizontal digital filters, which are set so as to trap a carrier component resulting from the sampling structure of each color simultaneously with band-limiting.

For example, in the third embodiment, each RGB color filter element is selected to have a filter coefficient which exhibits a trap characteristic with respect to a carrier component of a frequency which is half a sampling frequency. The matrix computation circuit 751 also generates a low-frequency luminance signal (YL). The YL signal is subtracted from a YH signal subjected to gamma correction in a gamma correction circuit 736, whereby a YH-YL signal is formed. The YH-YL signal is band-limited by a digital filter 741 and is then added to the YL signal by an adder 742 which has been delayed by a delay 744. The output of the adder 742 is added by an adder 743 to a signal obtained by extracting a high-frequency component from the YH signal through a processing system consisting of elements 738 to 740, whereby the high frequency band of the luminance signal is enhanced. Subsequently, the color-difference signals are subjected to color-removing processing in a suppress circuit 755 if they are high-luminance signals, then subjected to blanking processing together with the luminance signal in blanking circuits 757 to 759, and then converted into an analog signal in a D/A (digital-to-analog) converter 760. A circuit 761 is an addition circuit for adding a sync signal, and an encoder 762 converts input signals into signals which conform to a predetermined television system. Sync clocks for the present device are produced by a frequency synthesizer 752, and a sync signal generator 754 generates sync signals.

In FIGS. 7(a), 7(b) and 7(c), the portion shown as A (FIG. 7(a)) represents a camera recording system of the present camera system and the portion shown as B (FIGS. 7(b) and 7(c)) represents a reproducing system of the present camera system. The foregoing description has referred to the reproducing system. The recording system is simpler than the reproducing system. The output from the buffer memory 707 is compressed by a compressing/expanding circuit 711 and is then inputted into a card format conversion circuit 712, where it is converted into a format conforming to a card 713. The signal thus compressed and converted is recorded on the card 713. At this time, the following signals are also recorded by the system controller 714 together with such a compressed signal: the size of an image (m×n); an address offset value; each bit pattern; cycle periods 1, 2 and the digital filter values of the respective digital filters 722 to 728 (a system controller 729 for coefficient setting sets the matrix coefficients of the respective digital filters 722 to 728); a decision value for chroma suppression; coring level multipliers A1, A2, A3 and A4; a RGB matrix computation constant; the digital filter multipliers of the respective digital filters 738, 741, 753 and 763; the frequency-dividing factor of the frequency synthesizer 752; an exposure value; a date; a message; and the like.

As is apparent from the foregoing description, in accordance with any of the embodiments, it is possible to provide a general-purpose digital camera signal processing device capable of effecting camera signal processing irrespective of the arrangement of a color filter for an image sensor.

What is claimed is:

1. A digital camera signal processing device comprising:
   (a) analog-to-digital converting means for performing analog-to-digital conversion of a signal supplied from an image sensor having a predetermined color filter arrangement;
   (b) color-signal separating means for separating color signals corresponding to sampling points for respective colors from an output signal from said analog-to-digital converting means; and
   (c) color-signal interpolating means for interpolating color signals for points where color signals are not separated from said output signal, on the basis of the color signals corresponding to the sampling points for the respective colors, the interpolating action of said interpolating means being variably set according to the arrangement of said color filter.

2. A digital camera signal processing device according to claim 1, wherein said color-signal interpolating means is a programmable two-dimensional filter.

3. A digital camera signal processing device according to claim 1, wherein said color-signal interpolating means is a combination of programmable one-dimensional filters.

4. A digital camera signal processing device according to claim 1, 2 or 3, further comprising a memory into which the output signal from said analog-to-digital converting means is written and from which a signal is read and supplied to said color-signal separating means.

5. A signal processing device comprising:
   (a) signal supplying means for supplying signals of different colors sequentially in a time-division manner;
   (b) interpolating means for performing interpolation processing of a portion of the supplied signals in which none of the different colors are present, on the basis of the supplies signals of the different colors; and
   (c) setting means for variably setting the interpolation processing performed by said interpolating means, in accordance with the manner of supply of the signals from said signal supplying means.

6. A signal processing device according to claim 5, wherein said signal supplying means includes image sensing means having a predetermined color filter.

7. A signal processing device according to claim 6, wherein the image sensing means includes a charge-coupled device.

8. A signal processing device according to claim 5, wherein said interpolating means includes a matrix computation circuit corresponding to the different colors 9. A signal processing device according to claim 5, wherein said interpolating means is a combination of programmable one-dimensional filters.

* * * * *

UNITED STATES PATENT AND TRADEMARK OFFICE
CERTIFICATE OF CORRECTION

PATENT NO. : 5,262,849                             Page 1 of 2
DATED      : November 16, 1993
INVENTOR(S): Toshihiko Mimura; Eiji Ohara It is certified that error appears in the above-indentified patent and that said Letters Patent is hereby corrected as shown below:

In the drawing:
    In Fig. 5. Change "digilal" to -- digital --

Col. 1, line 16. Change "bee" to -- been --

Col. 2, line 41, 43. Delete "-"

Col. 5, line 4. Change "I" to -- $\ell$ --

Col. 5, line 5. Delete "is" first occurrence

Col. 6, line 57. Change "(1xm) (1xn)( rep-" to
    -- (1xm)⊗(1xn)(⊗rep- --

Col. 7, line 1. Change "shows" to -- shown --

Col. 7, line 47, 49, 54. Change "11 to 13" to
    -- $\ell$1 to $\ell$3 --

Col. 8, line 17. Change "use" to -- used --

UNITED STATES PATENT AND TRADEMARK OFFICE
CERTIFICATE OF CORRECTION

PATENT NO. : 5,262,849

DATED : November 16, 1993

INVENTOR(S) : Toshihiko Mimura, Eiji Ohara

It is certified that error appears in the above-indentified patent and that said Letters Patent is hereby corrected as shown below:

Col. 9, line 30. Change "A" to -- $\overleftarrow{A}$ --

Signed and Sealed this

Fifth Day of July, 1994

BRUCE LEHMAN

Attest:

Attesting Officer

Commissioner of Patents and Trademarks